United States Patent
Guy et al.

[11] Patent Number: 5,832,241
[45] Date of Patent: Nov. 3, 1998

[54] DATA CONSISTENCY ACROSS A BUS TRANSACTIONS THAT IMPOSE ORDERING CONSTRAINTS

[75] Inventors: Charles B. Guy, Hillsboro; Bruce Young, Tigard; Norman Rasmussen, Hillsboro, all of Oreg.

[73] Assignee: Intel Corporation, Santa Clara, Calif.

[21] Appl. No.: 878,660

[22] Filed: Jun. 19, 1997

Related U.S. Application Data

[63] Continuation of Ser. No. 393,556, Feb. 23, 1995, abandoned.
[51] Int. Cl.⁶ ............................................. H01J 13/00
[52] U.S. Cl. ........................ 395/292; 395/728; 395/859; 395/857; 395/309
[58] Field of Search ..................... 395/284, 287, 395/292, 298, 305, 306, 309, 860, 728, 731, 732, 856, 857, 859, 863, 200.38, 200.42, 200.43, 200.44, 200.46, 300

[56] References Cited

U.S. PATENT DOCUMENTS

| | | | |
|---|---|---|---|
| 5,269,005 | 12/1993 | Heil et al. | 395/821 |
| 5,367,695 | 11/1994 | Narad et al. | 395/800 |
| 5,499,346 | 3/1996 | Amini et al. | 395/308 |
| 5,535,340 | 7/1996 | Bell et al. | 395/292 |
| 5,546,546 | 8/1996 | Bell et al. | 395/292 |
| 5,568,620 | 10/1996 | Sarangdhar et al. | 395/285 |
| 5,586,274 | 12/1996 | Bryg et al. | 395/288 |
| 5,588,125 | 12/1996 | Bennett | 395/306 |
| 5,625,779 | 4/1997 | Solomon et al. | 395/293 |
| 5,630,094 | 5/1997 | Hayek et al. | 395/473 |

*Primary Examiner*—Ayaz R. Sheikh
*Assistant Examiner*—Raymond N. Phan
*Attorney, Agent, or Firm*—Blakely, Sokoloff, Taylor & Zafman

[57] ABSTRACT

A bus bridge is disclosed that handles bus transactions that must be completed on a destination bus before being completed on an originating bus by indicating a retry to delay such bus transactions on the originating bus while completing such bus transactions on the destination bus.

15 Claims, 5 Drawing Sheets

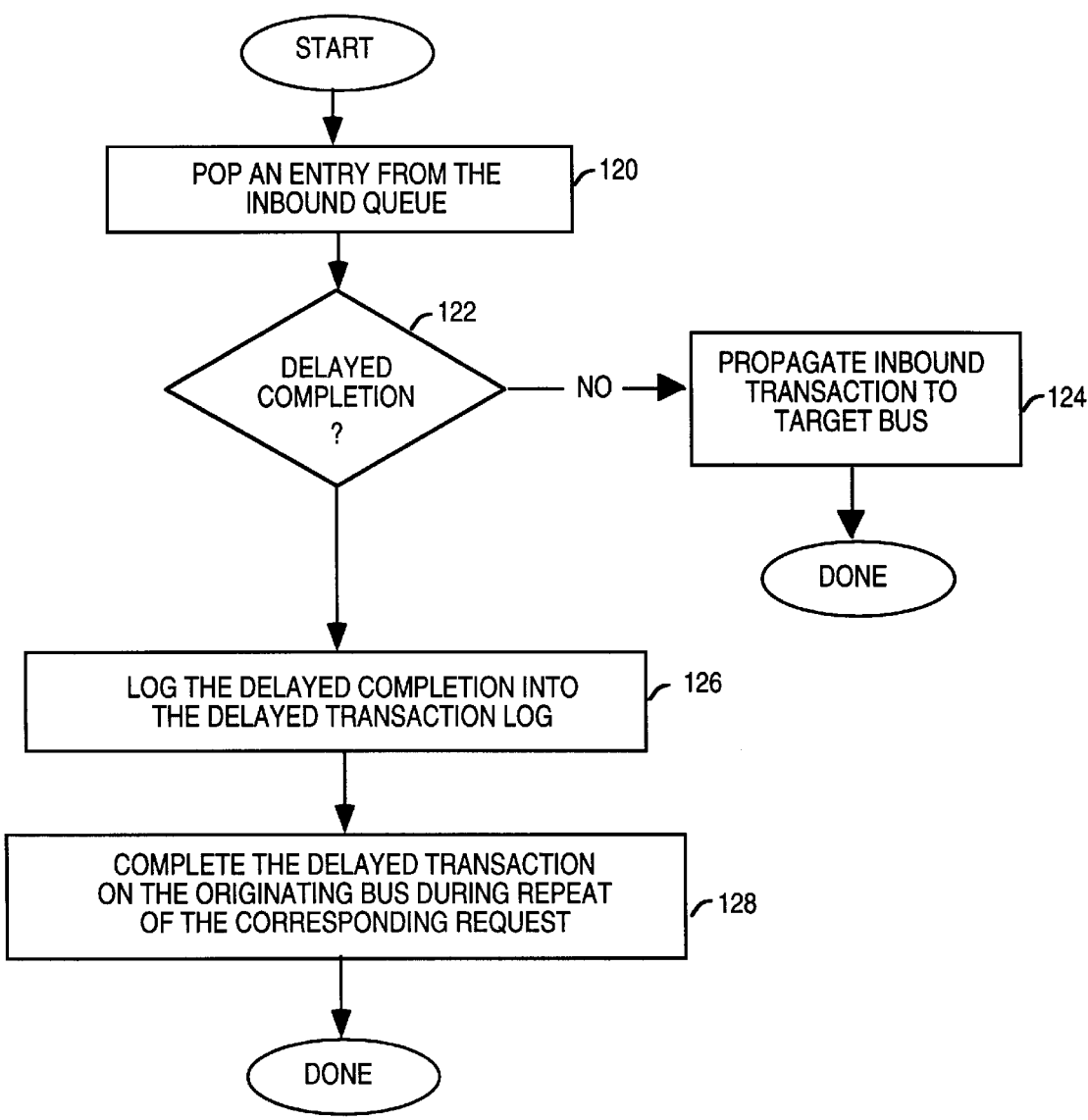

DATA CONSISTENCY ACROSS A BUS TRANSACTIONS THAT IMPOSE ORDERING CONSTRAINTS

This is a continuation of application Ser. No. 08/393,556, filed Feb. 23, 1995, now abandoned.

BACKGROUND OF THE INVENTION

1. Field of the Invention

The present invention pertains to the field of computer systems. More particularly, this invention relates to a data consistency mechanism in a bus bridge for handling bus transactions that are required to complete on a destination bus before completing on an originating bus.

2. Background

Prior computer systems commonly provide a bus that enables communication between computer system components such as a central processing unit and a main memory. Such a bus may be referred to as a system bus, a memory bus, or a host bus. Such a computer system may also include one or more input/output or peripheral buses. Such input/output or peripheral buses typically enable communication to input/output devices for the computer system. Such input/output buses or peripheral buses are typically standardized and enable the connection of varying types devices to the computer system.

A computer system having multiple buses commonly includes one or more bus bridge circuits that enable communication between the various buses. Such bus bridge circuits may be arranged to provide a hierarchical bus structure including the memory or host bus on down to multiple levels of peripheral buses or input/output buses.

Each bus bridge circuit in such a system usually enables communication between a pair of buses which may be referred to as a primary bus and a secondary bus. For example, one such bus bridge circuit may enable communication between the memory or host bus as the primary bus and a peripheral bus as the secondary bus. Another bus bridge circuit may enable communication between the memory or host bus as the primary bus and a standardized input/output bus as the secondary bus. In addition, such bus bridge circuits may be positioned between peripheral or input/output buses at lower levels in the hierarchy.

Typically, each bus bridge circuit propagates communication transactions that originate on the primary bus to the secondary bus and propagates communication transactions that originate on the secondary bus to the primary bus according to a predetermined address mapping across the bus bridge circuit. The bus coupled to the bus agent that generates such a propagated communication transaction is typically referred to as the originating bus and the bus coupled to the target of the propagated communication transaction is typically referred to as the destination bus.

Prior bus bridge circuits commonly include one or more write buffers that enable posting of write data that propagates between the primary and secondary buses. Such posting of write data enables the completion of a memory write transaction on the originating bus before the memory write transaction completes on the destination bus. Such early completion of memory write transactions on the originating bus increases the overall system throughput because subsequent transactions on the originating bus are not delayed while the bus bridge circuit propagates the write data to the secondary bus.

Nevertheless, a bus bridge circuit typically must conform to predefined data ordering rules in such a computer system. For example, a bus bridge circuit is typically required to drain or flush all pending data out of the write buffers before propagating a read transaction from the originating bus to the destination bus. The write buffers must typically be flushed prior to such a read operation because the read operation may be targeted to a status register that indicates the state of a pending write transaction posted in one of the write buffers. As a consequence, such read transactions are typically required to complete on the destination bus before completing on the originating bus. Such constraints arise, for example, in systems that employ strong ordering requirements for IN and OUT instructions.

Unfortunately, such constraints on read transactions increase latency and slow the overall throughput on the originating bus. For example, an input/output device coupled to a peripheral or input/output bus may at times perform high bandwidth memory write cycles through a bus bridge circuit. Such high bandwidth memory writes may prevent the bus bridge circuit from draining the write buffers for the sustained interval of the memory writes. As a consequence, a read operation that originates during such high bandwidth memory writes usually incurs a high latency while the write buffers are completely drained.

Other types of communication transactions that are required to complete on the destination bus before completing on the originating bus include input/output read transactions and input/output write transactions. In addition, communication transactions to the configuration space of input/output devices in such a system must typically complete on the destination bus before completing on the originating bus. Such transactions are subject to similar high latency during high bandwidth memory writes.

SUMMARY OF THE INVENTION

A bus bridge is disclosed that handles strong ordering bus transactions that must be completed on a destination bus before being completed on an originating bus by indicating a retry to delay such bus transactions on the originating bus while completing such bus transactions on the destination bus. For one embodiment, the bus transactions that must be completed on the destination bus before being completed on the originating bus include read memory transactions, input/output read transactions, input/output write transactions, and configuration space read and write transactions.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 5 illustrates the handling of the inbound queue by the memory bus interface for one embodiment.

DETAILED DESCRIPTION

Figure 1:
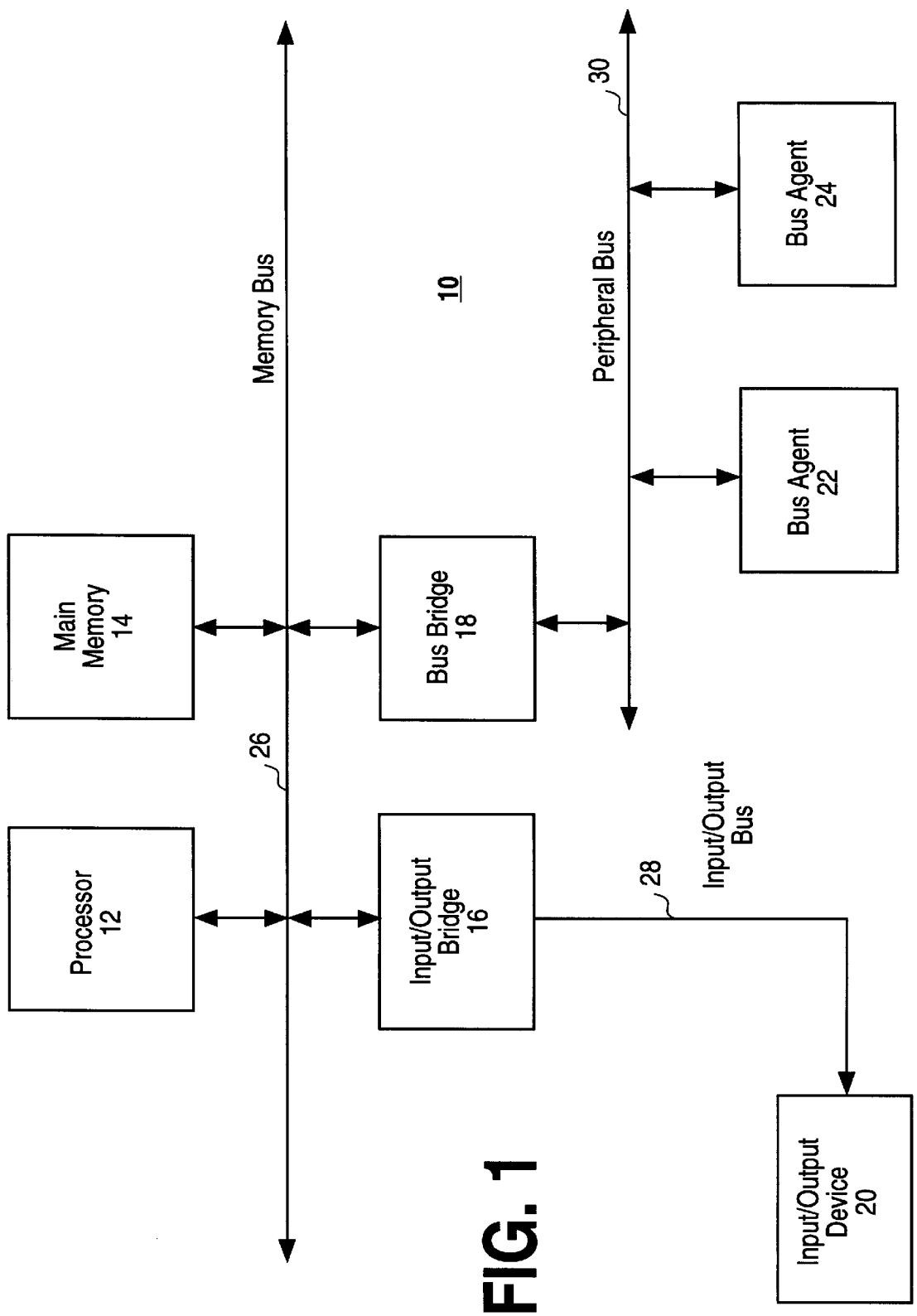
FIG. 1 illustrates a computer system including a processor and a main memory on a memory bus along with input/output devices and bus agents coupled to input/output and peripheral buses and corresponding bridge circuits.

FIG. 1 illustrates a computer system 10 for one embodiment. The computer system 10 comprises a processor 12 and a main memory 14 coupled for communication over a memory bus 26. The computer system 10 includes input/output devices such as an input/output device 20 coupled to an input/output bus 28. In addition, the computer system 10 includes peripheral bus agents such as a bus agent 22 and a bus agent 24 coupled for communication over a peripheral bus 30.

The computer system 10 further comprises an input/output bridge 16 that enables communication between the memory bus 26 and the input/output bus 28. The input/output bridge 16 enables transactions originating on the memory bus 26 to propagate to the input/output bus 28. In addition, the input/output bridge 16 enables transactions that originate on the input/output bus 28 to propagate to a target on the memory bus 26. The input/output bridge 16 implements a mechanism for delaying transactions that originate on the memory bus 26 and that are required to complete on the input/output bus 28 before completing on the memory bus 26.

The computer system 10 also includes a bus bridge 18 that enables communication between the memory bus 26 and the peripheral bus 30. The bus bridge 18 propagates transactions that originate on the memory bus 26 to targets on the peripheral bus 30. In addition, the bus bridge 18 propagates transactions that originate on the peripheral bus 30 to targets on the memory bus 26. For one embodiment the peripheral bus 30 conforms to a published specification for a standard peripheral component interconnect (PCI) bus.

The bus bridge 18 implements a mechanism for delaying transactions that originate on the memory bus 26 that are required to complete on the peripheral bus 30 before completing on the memory bus 26. Such a mechanism may also be implemented for delaying transactions that originate on the peripheral bus 30 and that are required to complete on the memory bus 26 before completing on the peripheral bus 30. The delayed transaction mechanisms in the bus bridge 18 are similar to the delayed transaction mechanisms implemented in the input/output bridge 16.

Figure 2:
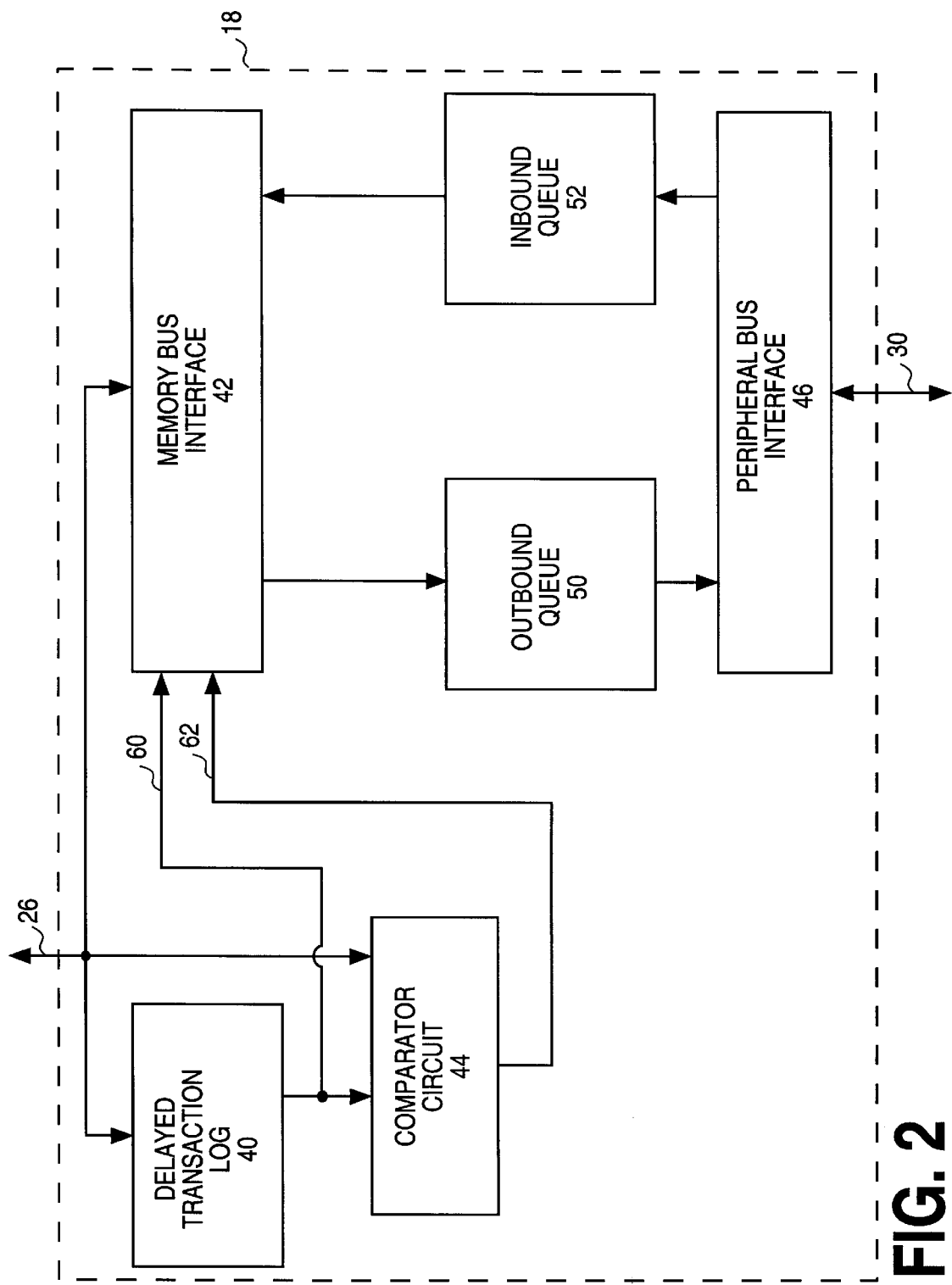
FIG. 2 illustrates a bus bridge including a memory bus interface, a peripheral bus interface, an outbound queue, an inbound queue, along with a delayed transaction log and a comparator circuit for the delayed transaction mechanism.

FIG. 2 illustrates the bus bridge 18 for one embodiment. The bus bridge 18 comprises a memory bus interface 42, a peripheral bus interface 46, an outbound queue 50, and an inbound queue 52. The bus bridge 18 also comprises a delayed transaction log 40 and a comparator circuit 44 for the delayed transaction mechanism.

The memory bus interface 42 senses memory write transactions originating on the memory bus 26 and posts the memory write transactions into the outbound queue 50. Thereafter, the peripheral bus interface 46 pops the memory write transactions from the outbound queue 50 and completes memory write transactions on the peripheral bus 30. For such memory write transactions, the memory bus interface 42 completes the transaction on the memory bus 26 before the peripheral bus interface 46 completes the corresponding memory write transaction on the peripheral bus 30.

The memory bus interface 42 also senses transactions that originate on the memory bus 26 and that are required to complete on the peripheral bus 30 before completing on the memory bus 26. Such transactions include, for example, memory read transactions that originate on the memory bus 26 and that are targeted for the peripheral bus 30 as well as input/output read transactions and input/output write transactions that originate on the memory bus 26 and targeted for the peripheral bus 30. For one embodiment, such transactions also include configurations space access transactions that originate on the memory bus 26 and that are targeted for the configuration space of the peripheral component interconnect bus 30.

The following description of the handling of the memory read transaction in the bus bridge 18 provides an illustration for such transactions. The handling of memory read transactions for purposes of delayed completion on the memory bus 26 is similar to that for input/output read and write transactions as well configuration space read and write transactions to the peripheral bus 30.

The memory bus interface 42 processes a memory read transaction originating on the memory bus 26 by latching the parameters for the memory read transaction and storing the parameters into the delayed transaction log 40. The memory bus interface 42 then indicates a retry to the memory read transaction to the originating bus agent coupled to the memory bus 26. The retry indication causes the originating bus agent on the memory bus 26 to terminate the memory read transaction in favor of a later retry of the memory read transaction. The memory bus interface 42 also writes the parameters for the delayed memory read transaction into the outbound queue 50. In addition, the memory bus interface 42 tags the delayed read memory transaction in the outbound queue 50 to indicate a delayed transaction.

Thereafter, the delayed memory read transaction propagates through the outbound queue 50 as the peripheral bus interface 46 empties the outbound queue 50 in the normal course of operation. The delayed read memory transaction that propagates through the outbound queue 50 is referred to as a delayed request.

The peripheral bus interface 46 eventually pops the delayed request containing the delayed read transaction from the outbound queue 50 and completes the specified read transaction over the peripheral bus 30. The delayed read may be targeted for one of the bus agents 22 or 24 coupled to the peripheral bus 30 or may be targeted for a bus agent coupled through another bus bridge (not shown) to a lower level of a multi-level hierarchy of the computer system 10.

After completing the delayed read transaction on the peripheral bus 30, the peripheral bus interface 46 writes a delayed completion including delayed completion parameters into the inbound queue 52. The delayed completion parameters include the tag of the corresponding delayed request originally placed in the outbound queue 50. For a delayed read transaction, the delayed completion parameters also include the read data for the delayed read transaction retrieved over the peripheral bus 30.

The delayed completion flows through the inbound queue 52 as the memory bus interface 42 pops entries off the inbound queue 52. Eventually, the delayed completion reaches the top of the inbound queue 52. The memory bus interface 42 recognizes the delayed completion via the delayed transaction tag in the inbound queue 52. The delayed completion remains at the top of the inbound queue 52 until the originating agent of the delayed read transaction retries the read transaction over the memory bus 26. The bus bridge 18 recognizes the retried memory read transaction by comparing the parameters logged in the delayed transaction log 40 with the retry parameters received over the memory bus 26 using a comparator circuit 44.

Once the retry for the delayed read transaction is received over the memory bus 26, the memory bus interface 42 extracts the delayed completion information from the inbound queue 52 and completes the read transaction over the memory bus 26. Thereafter, the memory bus interface 42 continues processing entries from the inbound queue 52.

Figure 3:
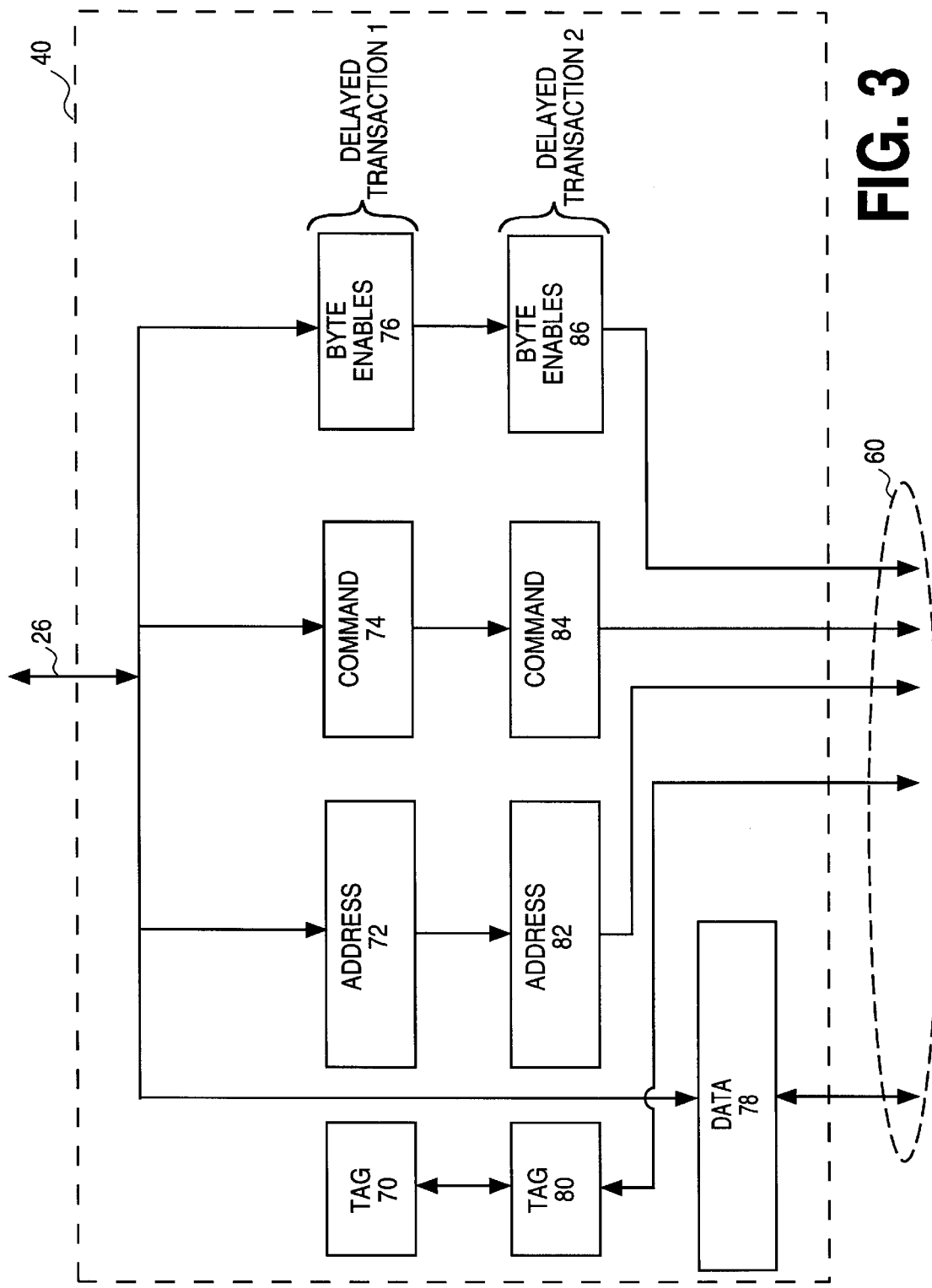
FIG. 3 illustrates the delayed transaction log for one embodiment which includes registers that accommodate a delayed transaction 1 and a delayed transaction 2.

FIG. 3 illustrates the delayed transaction log 40 for one embodiment. The delayed transaction log includes registers that accommodate a pair of delayed transactions comprising a delayed transaction 1 and a delayed transaction 2. The architecture shown enables the memory bus interface 42 to delay two separate transactions that originate on the memory bus 26 and that are required to complete on the peripheral bus 30 before completing on the memory bus 26. For other embodiments, the delayed transaction log 40 may include additional registers to allow the memory bus interface 42 to delay additional transactions that require such ordering.

The delayed transaction 1 is logged in an address register 72, a command register 74 and a byte enables register 76. In addition, data for the delayed transaction is latched if the delayed transaction is a write transaction. The address register 72 holds the latched address for the delayed transaction on the memory bus 26. The command register 74 holds the latched command for the delayed transaction which for one embodiment comprises either a memory read command, an input/output read command, an input/output write command, a configuration read command or a configuration write command.

The byte enables register 76 holds the latched byte enable signals on the memory bus 26 that indicate the data width for the delayed transaction.

In addition, a tag register 70 stores a tag generated by the memory bus interface 42 that identifies the delayed transaction 1 as the delayed transaction 1 flows through the outbound queue 50 as a delayed request and thereafter flows back through the inbound queue 52 as a delayed completion. The tag stored in the tag register 70 corresponds to the tag in the delayed completion as the delayed completion flows up through the inbound queue 52.

The delayed transaction log 40 includes a data register 78. The data register 78 holds the read data that returns through the outbound queue 52 for delayed read memory transactions or input/output read transactions or configuration read transactions that flow up with a delayed completion through the inbound queue 52.

Similarly, the delayed transaction 2 is logged in an address register 82, a command register 84 and a byte enables register 86 along with a tag register 80 stores a tag generated by the memory bus interface 42 that identifies the delayed transaction 2.

Figure 4:
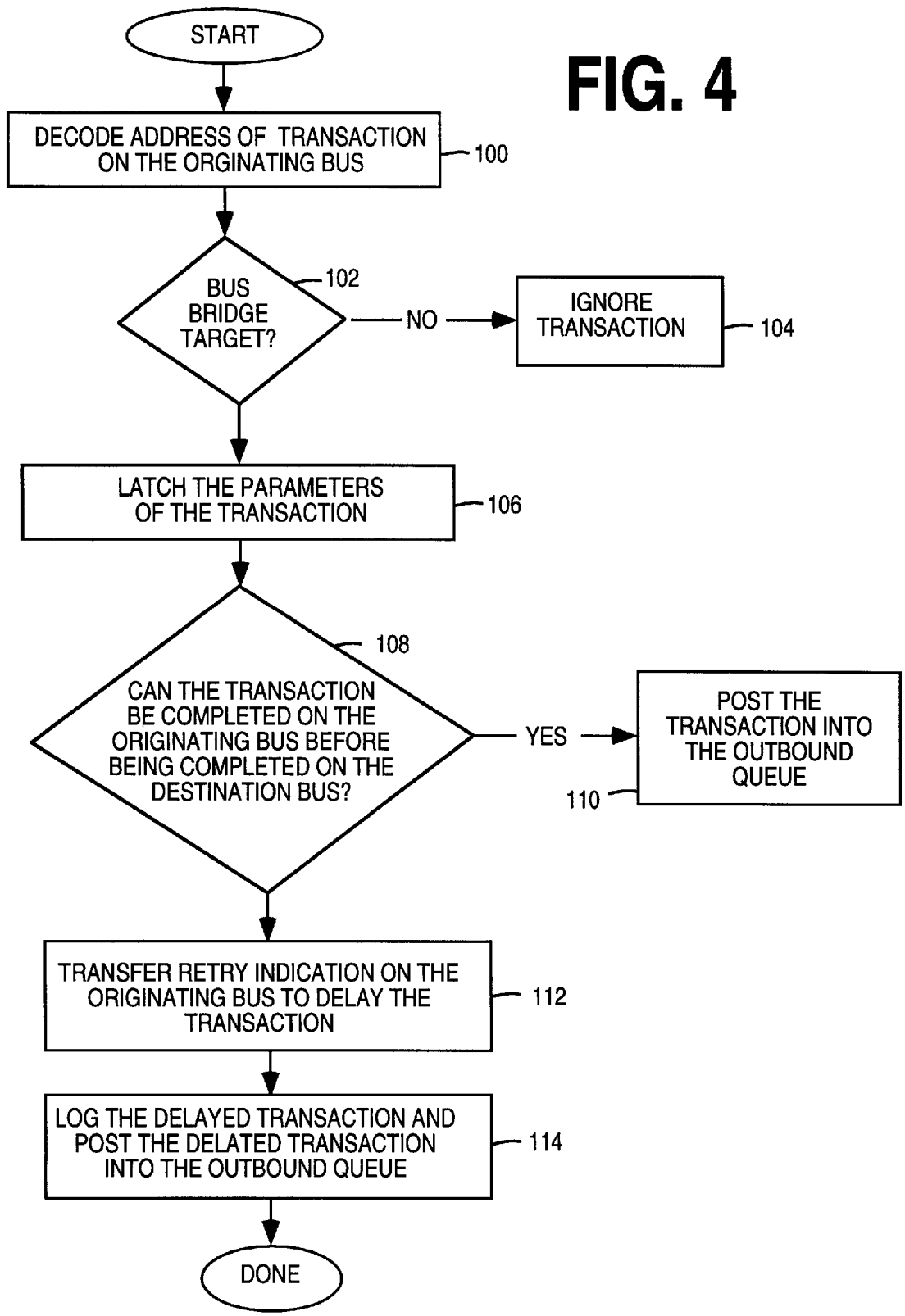
FIG. 4 illustrates the handling of communication transactions that originate on the memory bus by the memory bus interface for one embodiment.

FIG. 4 illustrates the handling of communication transactions that originate on the memory bus 26 by the memory bus interface 42 for one embodiment. At block 100, the memory bus interface 42 decodes the address of the transaction originating on the memory bus 26.

Thereafter, at decision block 102 the memory bus interface 42 determines whether the transaction originating on the memory bus 26 is targeted for an addressed serviced by the bus bridge 18. Such targets include for example, the bus agents 22 and 24 coupled to the peripheral bus 30. If the communication transaction is not targeted for the proper bus bridge target at decision block 102 then control proceeds to block 104. At block 104, the memory bus interface 42 ignores the communication transaction which is targeted for some other agent coupled to the memory bus 26.

If the communication transaction is targeted for the bus bridge 18 at decision block 102 then control proceeds to block 106. At block 106, the memory bus interface 42 causes the delayed transaction log 40 to latch the parameters of the transaction into an appropriate set of available registers delayed transaction registers. For one embodiment, the delayed transaction log 40 latches the address, the command, and the set of byte enables for the communication transaction originating on the memory bus 26.

Thereafter at decision block 108, the memory bus interface 42 determines whether the transaction can be completed on the originating memory bus 26 before being completed on the destination peripheral bus 30. If the transaction can be completed on the memory bus 26 before being completed on the peripheral bus 30 then control proceeds to block 110. At block 110 the memory bus interface 42 posts the transaction into the outbound queue 50.

If the memory bus interface 42 determines that the transaction can not be completed on the memory bus 26 before being completed on the peripheral bus 30 then control proceeds to block 112. At block 112, the memory bus interface 42 transfers a retry indication over the memory bus 26 to the originating bus agent to delay the transaction. The retry indication causes the originating bus agent on the memory bus 26 to later repeat the transaction.

At block 114, the memory bus interface 42 logs the delayed transaction into the delayed transaction log 40 into the appropriate set of registers and generates a corresponding delayed transaction tag and posts the delayed transaction into the outbound queue 50. Thereafter, the delayed transaction propagates or flows through the outbound queue 50 and is completed by the peripheral bus interface 46 on the peripheral bus 30. The peripheral bus interface 46 then stores or posts a delayed completion for the delayed transaction into the inbound queue 52 including the tag associated with the delayed transaction.

FIG. 5 illustrates the handling of the inbound queue 52 by the memory bus interface 42 for one embodiment. At block 120, the memory bus interface 42 pops an entry from the inbound queue 52. If the tag field of the inbound queue entry indicates a delayed completion at decision block 122 then control proceeds to block 126. At block 126 the memory bus interface 42 logs the delayed completion into the delayed transaction log 40.

Thereafter at block 128, the memory bus interface 42 completes the delayed transaction on the memory bus 26 during the next time that the delayed transaction is repeated over the memory bus 26. The comparator circuit 44 detects the repeat of the logged delayed transaction by comparing the address, command, and byte enables of incoming transactions with the corresponding parameters stored in the delayed transaction log 40.

If a delayed completion is not indicated at decision block 122, then control proceeds to block 124. At block 124, the memory bus interface 42 propagates the entry popped from the inbound queue 52 to the memory bus 26 as the target bus of the transaction.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for processing a bus transaction from an originating bus agent, to a target bus agent, said method comprising the steps of:

initiating a bus transaction with a request to a target bus agent;

converting said bus transaction into a delayed transaction request by storing parameters for said bus transaction into a delayed transaction log;

indicating a retry to said originating bus agent, said retry causing said originating bus agent to terminate said bus transaction and to tag said bus transaction for a later retry;

said delayed transaction request producing a response, said response to said delayed transaction request including delayed response parameters, said delayed response from the target bus agent being stored in an inbound queue;

said originating bus agent retrying said bus transaction;

comparing parameters of said retried bus transaction with said response parameters to determine whether said response is intended for said originating bus agent retrying said bus transaction; and said retried bus transaction returning said response from said inbound queue if said parameters of said retried bus transaction match said parameters for said response.

2. The method of claim 1, wherein the bus transaction is a read memory transaction.

3. The method of claim 1, wherein the bus transaction is an input/output read transaction.

4. The method of claim 1, wherein the bus transaction is an input/output write transaction.

5. The method of claim 1, wherein the bus transaction is a configuration space read transaction.

6. The method of claim 1, wherein the bus transaction is a configuration space write transaction.

7. The method of claim 1 wherein said step of comparing parameters of said retried bus transaction with said response parameters includes the step of a comparator circuit comparing parameters of said retried bus transaction with said response parameters.

8. An apparatus for processing a bus transaction from an originating bus agent to a target bus agent, said apparatus comprising:

means for initiating a bus transaction with a request to a target bus agent;

means for converting said bus transaction into a delayed transaction request by storing parameters for said bus transaction into a delayed transaction log;

means for indicating a retry to said originating bus agent, said retry causing said originating bus agent to terminate said bus transaction and to tag said bus transaction for a later retry;

means for producing a response to said delayed transaction request, the response including delayed response parameters, said response from the target bus agent being stored in an inbound queue;

means for retrying said bus transaction;

means for comparing parameters of said retried bus transaction with said response parameters to determine whether said response is intended for said originating bus agent retrying said bus transaction; and means for returning said response from said inbound queue if said parameters of said retried bus transaction match said parameters for said response.

9. The apparatus of claim 8, wherein the bus transaction is a read memory transaction.

10. The apparatus of claim 8, wherein the bus transaction is an input/output read transaction.

11. The apparatus of claim 8, wherein the bus transaction is an input/output write transaction.

12. The apparatus of claim 8, wherein the bus transaction is a configuration space read transaction.

13. The apparatus of claim 8 wherein the bus transaction is a configuration space write transaction.

14. The apparatus of claim 8 wherein said means for comparing parameters of said retried bus transaction with said response parameters includes a comparator circuit for comparing parameters of said retried bus transaction with said response parameters.

15. An apparatus for processing a bus transaction from an originating bus agent to a target bus agent, said apparatus comprising:

an originating bus agent including circuitry for initiating a bus transaction with a request to a target bus agent;

a bus bridge coupled to said originating bus agent via a bus, said bus bridge including circuitry for converting said bus transaction into a delayed transaction request by storing parameters for said bus transaction into a delayed transaction log, said bus bridge further including circuitry for indicating a retry to said originating bus agent, said retry causing said originating bus agent to terminate said bus transaction and to tag said bus transaction for a later retry;

a target bus agent coupled to said bus bridge via a bus including circuitry for producing a response to the delayed transaction request, the response including delayed response parameters, said bus bridge further including an inbound queue for storing said response parameters, said bus bridge further including compare circuitry for comparing parameters of said retried bus transaction with said response parameters to determine whether said response is intended for said originating bus agent retrying said bus transaction and if so returning said response to said originating bus agent.

* * * * *